United States Patent [19]
Davidson

[11] Patent Number: 4,782,240
[45] Date of Patent: Nov. 1, 1988

[54] SAFETY BATTERY CONNECTOR

[76] Inventor: Samuel L. Davidson, 3701 College Ave., Monroe, La. 71203

[21] Appl. No.: 879,174

[22] Filed: Jun. 26, 1986

[51] Int. Cl.$^4$ .................... H01C 8/00; HO2G 3/00
[52] U.S. Cl. .................... 307/10 BP; 307/10 R; 439/754; 439/840
[58] Field of Search .................... 307/9, 10 R, 10 BP; 429/65, 179; 116/101, 102, 206, 207, 213, 216, 217, 218, 221; 339/224, 228, 229, 230 R, 230 C, 227, 226, 225, 263 R, 263 E, 263 L, 265, 256; 355/6, 7, 20, 26, 27, 17; 361/18, 21, 24, 30, 34, 37, 90, 91, 92; 200/DIG. 27, DIG. 28

[56] References Cited

U.S. PATENT DOCUMENTS

| | | | |
|---|---|---|---|
| 2,442,445 | 6/1948 | Toelle | 339/224 X |
| 2,646,018 | 7/1953 | Eakins | 339/263 R X |
| 2,729,802 | 1/1956 | Jordan et al. | 339/256 |
| 2,915,405 | 12/1959 | Hammond et al. | 116/218 |
| 3,217,125 | 11/1965 | Brackett | 335/17 X |
| 3,483,752 | 12/1969 | Rogen et al. | 116/216 |
| 3,516,082 | 6/1970 | Cooper | 116/216 X |
| 3,959,691 | 5/1976 | Clarke | 361/24 |
| 3,965,741 | 6/1976 | Wachtell et al. | 116/217 X |
| 3,965,848 | 6/1976 | Shotkin | 116/218 |
| 4,567,456 | 1/1986 | Legatti | 335/20 |
| 4,633,240 | 12/1986 | Guim et al. | 335/17 X |

Primary Examiner—William M. Shoop, Jr.
Assistant Examiner—Paul Ip
Attorney, Agent, or Firm—Holman & Stern

[57] ABSTRACT

The invention provides a safety battery connector which will shut-down the circuit in the case of an overload and thereby prevent short-circuiting and the like. The safety battery connector incorporates a manually resettable circuit breaker which is connected between the battery and an associated circuit in order to break the circuit in the case of an overload. The device may include an over-heating indicator which is associated with the conducting plate.

10 Claims, 1 Drawing Sheet

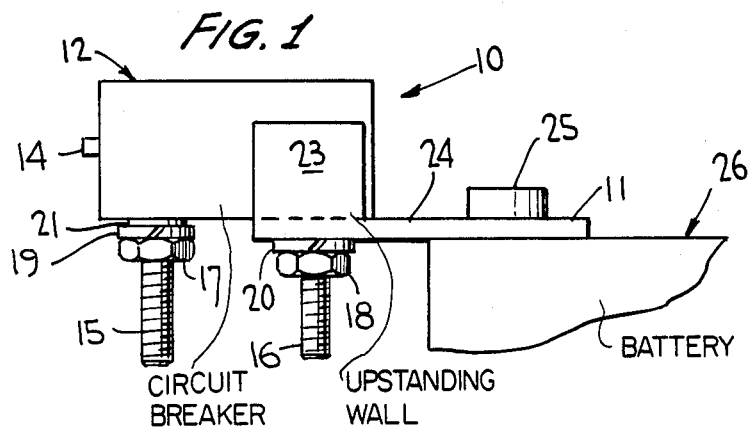
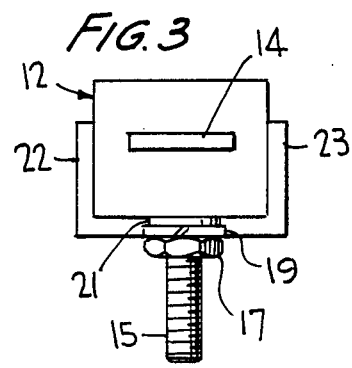
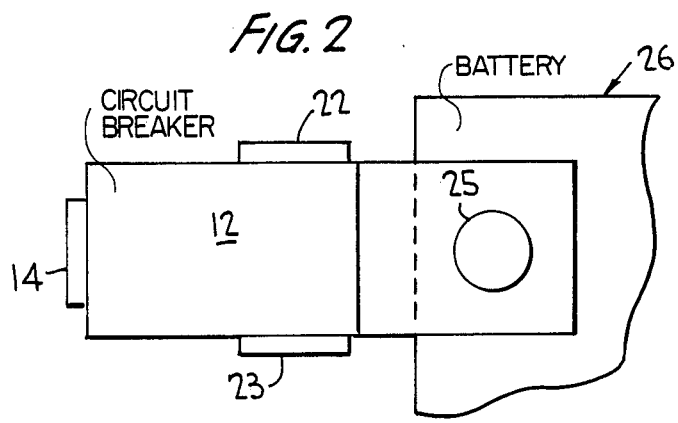
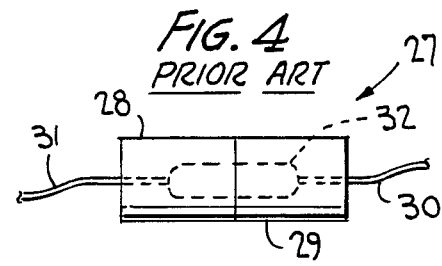
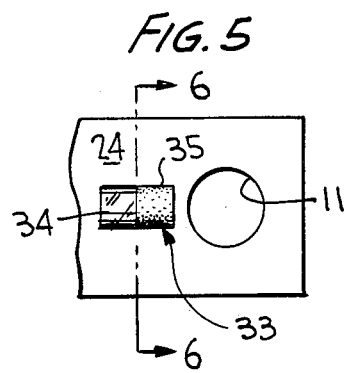
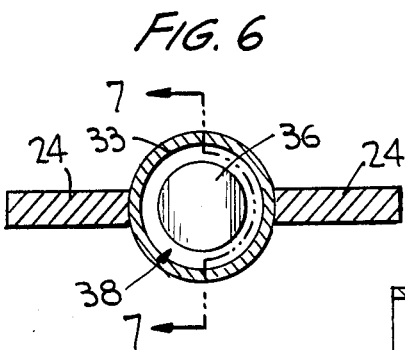
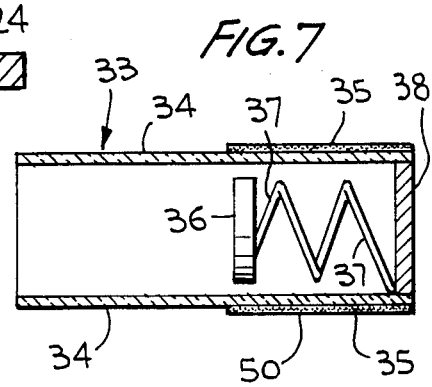
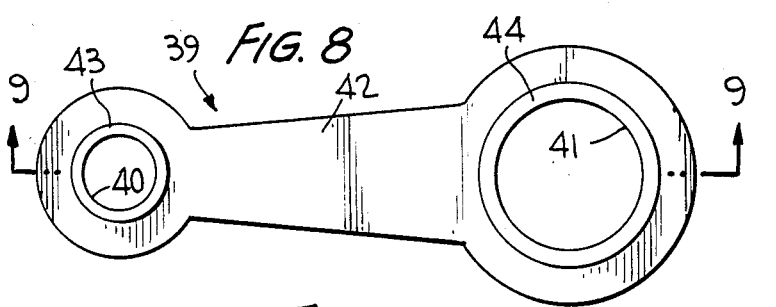
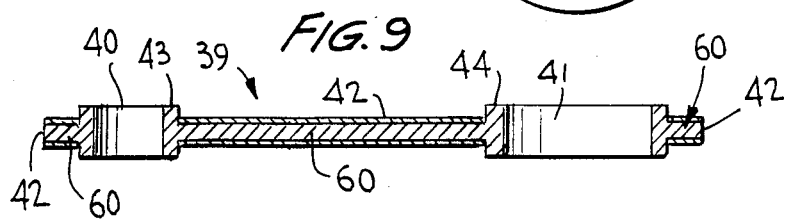

SAFETY BATTERY CONNECTOR

BACKGROUND OF THE INVENTION

1. The Technical Field

The present invention relates to battery connectors, and more particularly, to a device for safeguarding the battery and circuits against overloads. Further, the present invention relates to a safety battery connector for use on boats and for batteries used in the vicinity of water.

2. The Prior Art

Prior art devices are known for connecting a battery, such as a car battery or a boat battery, to an electrically driven device. Such devices usually include cables which are clamped or otherwise attached to one of the two posts of a battery. A problem with such cables is the possibility that the driven device will short out or become grounded, thereby draining the battery or causing a fire. Prior art attempts at solving or avoiding this problem including the interposition of a fuse element at some point in the cable attached to the battery, so that an overload will burn out the fuse and electrically isolate the battery on the driven device.

The use of fuses which burn out is not altogether satisfactory, since replacement of a fuse requires both time and effort in replacement, as well as requiring the ready availability of a suitable replacement fuse. On boats, for example, burning out of a fuse can be a very serious problem when no replacement fuse is available. In such instances, an attempt may be made to bypass the fuse by attaching an electrical conductor around the fuse, or by replacing the fuse itself with a conductor such as a penny or other coin. This however does not solve the problem of the cause of the burning-out of a fuse in the first place, and it is possible that the battery will be drained, or a fire will be started, due to the overload which was originally present and which originally caused the burning-out of the fuse.

Furthermore, where cables are used for connection of an electrical device electrically to a battery terminal, movement of such wires relative to the battery may cause fraying of the cable, and the potential for a short-circuit of the frayed cable. On a boat, the potential for such fraying is significant, since rocking and other movements of the boat, as well as the spray and washing of water near the battery, would facilitate short circuits wherever a frayed cable portion exists. Additionally, insulation covering a cable may be worn or eaten away by the presence of salt water, or by rot caused by the presence of water over an extended period of time.

In U.S. Pat. No. 2,729,802 to Jordan et al a battery connector is shown including a fuse and a means for completing the circuit despite burning-out of the fuse. In this patent, a connector is adapted to be fixedly connected to a terminal of a battery. A plate is fixedly connected to the terminal connector, and supports a second terminal adapted to be connected to a circuit for driving an electrical device. On the plate is disposed a fuse as well as a bypass cable. When the fuse burns out, it is removed from the circuit, and a movable end of the bypass cable is insertible into a mount previously supporting the fuse end which is adjacent the second post.

A problem with the prior art battery connectors is that the fuses can burn out, and are not re-settable. As discussed above, another problem is that cables connected to a battery post or terminal are susceptible to fraying, corrosion, and rotting, and therefore are susceptible to short circuiting, as well as being susceptible to overloading the battery and therefore draining the battery.

SUMMARY OF THE INVENTION

The present invention relates to a safety battery connector, which has a resettable circuit breaker and which is rigidly connectable to a battery terminal. The present invention is especially adapted for use on boats, ships, and other devices which are used near water. The present invention can be used together with any device requiring a battery to protect the battery against overloads.

The safety battery connector of the present invention has a mounting plate which can be fixed about a battery terminal to rigidly support a resettable circuit breaker, the resettable circuit breaker is electrically connected to the battery terminal by the conductive plate, the resettable circuit breaker having a second electrical connection for completing a circuit as by attachment to a conducter supplying an electrical device. The resettable circuit breaker has a pushbutton reset, so that upon breaking of the circuit, pushing of the pushbutton will reset the resettable circuit breaker so that the circuit is again closed and can supply electricity to an electrical device.

Another feature of the invention is an overheating indicator, to indicate a temperature in excess of a predetermined temperature on the plate supporting the resettable circuit breaker. This indicator is preferably enclosed in a glass cyliner with a metal base at one end supporting a nitinol wire in the shape of a spring. One half of the glass cylinder is covered with an opaque substance such as paint so as to obscure an indicating element at the end of a nitinol wire spring. The nitinol wire spring is in a compessed state, i.e. the nitinol wire was formed at an elevated temperature in the shape of a spring which is relative extended, and upon cooling has been compressed to the compressed length used in the present invention. Upon overheating of the plate supporting the circuit breaker, heat is transmitted to the nitinol wire through the conducting metal base, causing sudden extension of the nitinol spring to its original extended spring length. This causes the indicating element, such as a red colored button or the like to project beyond the opaque glass cylinder portion and into a transparent glass cylinder portion where it is visible. Cooling of the nitinol wire does not result in re-compression of the spring, and therefore a permanent record of any heating overload is possible. This permits, by visual inspection, determination of which portions of the electrical circuit have overheated, such as in the instance where the circuit breaker fails to break the circuit due to some other malfunction, whereby a visual indicator of a permanent nature is provided to show that such defect occured. Upon proper operation of the circuit breaker, the indicator will never expose the red button, since the purpose of the circuit breaker is to prevent overloads, such overloads tending to heat the metal plate supporting the circuit breaker, among other problems.

BRIEF DESCRIPTION OF THE DRAWINGS

FIG. 1 is a side elevational view of a safety battery connector according to the present invention connected to a terminal of a battery;

FIG. 2 is a top elevational view of a safety battery connector of FIG. 1;

FIG. 3 is a left hand elevational view of the battery connector of FIG. 1;

FIG. 4 is a view of a prior art connector having a fuse;

FIG. 5 is a top elevational view of the safety battery connector having an indicator according to the present invention;

FIG. 6 is a sectional view taken along line 6—6 of FIG. 5;

FIG. 7 is a side sectional view taken along line 7—7 of FIG. 6 showing the tube in section, and the indicator and spring in elevation;

FIG. 8 is a bottom elevational view of an alternative plate for supporting a circuit breaker according to the present invention; and FIG. 9 is a sectional view taken along line 9—9 of FIG. 8.

DETAILED DESCRIPTION OF THE INVENTION

FIG. 1 shows a safety battery connector 1 fixedly connected to a battery terminal 25 of a battery 26. The safety battery connector 1 has a resettable circuit breaker 12 having a reset pushbutton 14, the circuit breaker 12 being supported by a plate 24. A threaded member 16 projects from the circuit breaker 12 and penetrates through an aperture (shown in dotted outline in FIG. 1) in the plate 24. A washer 20 and a nut 18 are then used to fix the circuit breaker 12 to the plate 24. A second post 15 projects from the circuit breaker 12, and also supports the washer 19 and nut 17, to permit ready connection to an electrical conductor of a downstream electrical device (now shown), as is conventional. A boss 21 is formed on the lower surface of the circuit breaker 12 about the base of the respective projections 15 and 16. An upstanding wall 23 is formed from the plate 24 by bending, so as to retain the circuit breaker 12 securely.

FIG. 2 shows the top of the circuit breaker 12, and also shows another upstanding wall 22 which is formed symmetrically about the plate 24 relative to the wall 23. An aperture 11 is seen in the plate 24, surrounding the terminal 25. The plate 24 snugly receives the terminal 25 so as to be in electrically conducting relationship therewith. The plate 24 is advantageously formed of steel, copper, aluminum, or any other electrically conducting material which is sufficiently strong and stable to support the circuit breaker 12.

The circuit breaker 12 can be of any conventional type having two terminals, including one terminal for receiving the power supply connection to supply power to the circuit breaker 12, and a second terminal for providing an output from the circuit breaker 12, the circuit breaker 12 having a resettable circuit breaking means (well known iin the prior art) for breaking the electrical connection between the posts 15 and 16. An example of such a circuit breaker which is resettable includes a circuit breaker bearing part no. 324, for use at 24 volts and 20 amps having a reset pushbutton, depression of the reset pushbutton causing resetting of the circuit breaker to cause electrical connection again between the posts 15 and 16 following an interruption. The pushbutton 14 is spring biased to cause the pushbutton to return to its extended position. Another example of such a resettable circuit breaker is a conventional device bearing part no. 076, for use at 12 volts and 20 amps. The present invention is not limited to any particular resettable circuit breaker embodiment, but is contemplated as including all resettable circuit breakers which are conventional or known.

FIG. 3 is a view from the left hand side of FIG. 1 of the circuit breaker 12 showing the pushbutton 14 and upstanding walls 22 and 23. The upstanding walls 22 and 23 of the plate 24 are advantageously formed from a flat sheet of metal, which is then appropriately bent to form the upstanding walls 22 and 23.

FIG. 4 shows a prior art device having a casing 27, a casing half 28, another casing half 29, an electrical conductor 31 passing into the casing half 28, an electrical conductor 30 passing into the case 29, and a fuse 32 (seen in dotted outline) which is in electrical communication with respective ends of the conductors 30 and 32. Opening of the casing halves 28 and 29 permits replacement of the fuse 32.

FIG. 5 is a top elevational view of the plate 24 supporting an indicating element 33. The indicating element 33 is formed as a glass tube having a transparent portion 34 and an opaque portion 35. The opaque portion may be painted, silvered, or the like, so as to obsure the contents of the glass tube 33 in the region 35.

FIG. 6 is a sectional view showing the cross section of the glass tube 33 disposed in the plate 24, along with an indicating button 36, preferably of a highly visible color such as red or yellow. The present invention is not limited to a round cross-section for the glass tube 33, nor is it limited to a round shape for the button 36. Other shapes can be used, as well as other materials, for instance plastic can be used for the tube 33 if desired.

FIG. 7 is a side sectional view taken along line 7—7 of FIG. 6, showing the glass tube wall 33 in section, and showing the button 36 and spring 37 in elevational view, along with the base 38. The base 38 is preferably a metal disc which is glued or otherwise attached within the tube 33, and which is in contact with the support plate 24. The spring 37 is composed of nitinol, which is an alloy which has "shape memory". Such shape memory elements are well-known in the camera arts for high speed shutters, and in the metallurgical and toy arts as well. Such "shape memory" alloys have the characteristic that they are formed at a first temperature to have a first shape. They are then deformed to a second shape, and upon heating return to the first shape. Desired temperatures can be selected based upon metallurgical science and the alloy composition. Any other "shape memory" materials can be used instead of the nitinol wire spring, and all such other materials are contemplated as being within the scope of the present invention.

As seen in FIG. 7, an opaque coating 50 surrounds the portion of the tube 33 which contains the button 36 and spring 37, thereby concealing same. Upon heating of the support 24, heater is conducted to the base 38 and thence to the spring 37, causing sudden expansion thereof to its original, elongated spring length. This forces the button 36 to a position so as to be visible through the clear portio 34 of the tube 33. This provides a permanent indication of overheating of the support plate 24, which in turn would strongly suggest a failure of the circuit breaker 12. Thus, the indicator shown in FIG. 7 can indicate failure of the resettable circuit breaker 12 under normal operating conditions.

FIG. 8 is a bottom elevational view of an alternative support plate 39 used instead of the support plate 24 of FIG. 1. An aperture 41 therein is sized to receive a battery terminal, and an aperture 40 therein is sized to receive the projection 16 of the resettable circuit breaker 12. Other shapes for the support plate 39 are also contemplated as being within the scope of the present invention.

The support plate 39 has a plastic, insulating coating 42 which covers all electrical surfaces except for raised bosses 43 and 44. The insulating plastic material provides additional corrosion resistance for the support plate 39, which will be subjected to moisture and corrosive salt water during its expected use.

Although not shown in FIG. 8, the support plate 39 will have, in a preferred version, a pair of upstanding arms similar to upstanding arms 22, 23 of the support plate 24 shown in FIGS. 1-3. Such arms would preferably extend upwardly from the uppermost and lowermost portions of the support plate 39, in the vicinity of the opening 40 of FIG. 8. Such arms would serve the same function as arms 22 and 23 of FIGS. 1-3, namely to securely retain the circuit breaker 12. Any known other means of securing the circuit breaker No. 12 to the support plate 39 are also contemplated as being within the scope of the present invention, and is not limited to the provision of arms similar to arms 22 and 23 of FIGS. 1-3.

FIG. 9 is a side sectional view taken along line 9—9 of FIG. 8, showing the plastic coating 42 covering the top, bottom, and side surfaces of the support plate material 60. The material 60 is preferably a metal such as aluminum, stainless steel, iron, and the like which is capable of conducting electrical current. The plastic coating 42 serves to provide additional corrosion resistance, except in the area of the raised bosses 43, 43 and 44, 44 as seen in FIG. 9. Thus, as seen in FIG. 9, the metal 60 of the support plate 39 is only exposed in the regions of anticipated direct electrical connection.

While preferred embodiments have been shown, it will be understood that the present invention is not limited thereto, but may be otherwise embodied within the scope of the following claims.

What is claimed is:

1. A safety battery connector for preventing overloading of a battery, comprising:
   a rigid, electrically conducting support plate;
   a means for connecting said support plate in electrical conducting relationship around a terminal of a battery;
   a circuit breaker means;
   a connector means for connecting said support plate to the circuit breaker means;
   said circuit breaker means being manually resettable;
   said circuit breaker means having an output member for providing electrical output connection for an electrically operated device;
   said support plate providing electrical connection between said terminal and said circuit breaker means and preventing movement of said circuit breaker means relative to the battery, such that short circuiting and overloading is prevented;
   wherein said support plate comprises a metal body having an aperture for receiving a battery terminal, and having a pair of upstanding side walls to receive said circuit breaker means.

2. A battery connector as claimed in claim 1, wherein said circuit breaker means is a circuit breaker member having a manual reset pushbutton, said circuit breaker member being generally in the form of a rectangular prismatic solid.

3. A battery connector as claimed in claim 1, further comprising an indicator for permanently indicating overheating of said support plate.

4. A battery connector as claimed in claim 3, wherein said indicator comprises a shaped memory alloy for irreversibly changing shape above a predetermined temperature and an indicator member fixedly connected to said shaped memory alloy for movement therewith.

5. A battery connector as claimed in claim 4, wherein said shape memory alloy is nitinol.

6. A battery connector as claimed in claim 5, wherein said indicator includes a glass tube which is partially opaque.

7. A battery as claimed in claim 6, wherein said indicator includes a metal base member connected to said glass tube for supporting one end of said shape memory alloy wire fixedly relative to said glass tube and wherein said indicator is mounted on said support plate.

8. A safety battery connector for preventing overloading of a battery on a boat, comprising:
   an electrically conducting support plate;
   said support plate having an aperture for receiving a battery terminal;
   said support plate having another aperture for receiving an electrically conducting projection from a manually resettable circuit breaker;
   a manually resettable circuit breaker having two electrically conducting projections;
   said manually resettable circuit breaker having a manual pushbutton reset;
   said support plate having a pair of upstanding side walls which receive said circuit breaker;
   said support plate being relatively rigid;
   whereby said circuit breaker is supported in fixed electrically conducting relationship to the battery, by the support plate, so as to prevent overloading of the battery due to short circuits and downstream overloads.

9. A safety battery connector as claimed in claim 8, further comprising an indicating means;
   said indicating means including a glass tube, a metal base fixedly connected to said glass tube, and a shape memory alloy wire spring disposed adjacent to said metal base;
   an indicator element disposed adjacent another end of said shape memory alloy wire spring;
   whereby overheating of said support member causes expansion of said shape memory alloy wire spring to an original extended condition so as to push said indicator element to a location where it is visible, so as to indicate permanently an overheating of the support plate.

10. A safety battery connector as claimed in claim 1, wherein said support plate has a generally annular-shaped end for receiving a battery terminal, and another annular-shaped end for receiving a projection from the circuit breaker means, said another annular-shaped end having a pair of upstanding side walls adapted to snugly receive said circuit breaker.

* * * * *